United States Patent
Niu et al.

(10) Patent No.: US 11,880,653 B2
(45) Date of Patent: Jan. 23, 2024

(54) PROVIDING CUSTOMIZED TERM EXPLANATION

(71) Applicant: International Business Machines Corporation, Armonk, NY (US)

(72) Inventors: Ya Niu, Beijing (CN); Nan Nan Li, Shang Hai (CN); Zu Rui Li, Shang Hai (CN); Li ping Wang, Shang Hai (CN); Di Hu, Shang Hai (CN); Qin Yue Chen, Shang Hai (CN)

(73) Assignee: International Business Machines Corporation, Armonk, NY (US)

(*) Notice: Subject to any disclaimer, the term of this patent is extended or adjusted under 35 U.S.C. 154(b) by 236 days.

(21) Appl. No.: 17/118,715

(22) Filed: Dec. 11, 2020

(65) Prior Publication Data
US 2022/0188511 A1  Jun. 16, 2022

(51) Int. Cl.
*G06F 40/242* (2020.01)
*G06F 40/289* (2020.01)
*G06F 40/30* (2020.01)
*G06F 16/9538* (2019.01)

(52) U.S. Cl.
CPC ........ *G06F 40/242* (2020.01); *G06F 16/9538* (2019.01); *G06F 40/289* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 8,126,700 | B2* | 2/2012 | Fasciani | G06F 40/169 704/4 |
| 9,009,100 | B2* | 4/2015 | Rechterman | G06F 16/9577 707/769 |
| 9,489,853 | B2* | 11/2016 | Sherman | G09B 5/00 |
| 9,684,713 | B2* | 6/2017 | Bhandari | G06F 16/3344 |
| 9,690,851 | B2* | 6/2017 | Nauze | G06F 16/313 |
| 10,339,218 | B1* | 7/2019 | Lakshmanan | G06F 40/242 |
| 2013/0212123 | A1* | 8/2013 | Matveenko | G06F 40/242 707/769 |
| 2013/0309640 | A1* | 11/2013 | Sanders | G09B 5/08 434/178 |
| 2015/0310002 | A1* | 10/2015 | Yu | G06F 40/30 707/750 |
| 2017/0177178 | A1* | 6/2017 | Garibay | G06F 40/134 |
| 2018/0365323 | A1* | 12/2018 | Doornenbal | G06F 16/9535 |
| 2020/0089739 | A1* | 3/2020 | Ho | G06F 3/011 |

(Continued)

OTHER PUBLICATIONS

Sierra, Gerardo, Rodrigo Alarcon, Alejandro Molina, and Edwin Aldana. "Web exploitation for Definition extraction." In 2009 Latin American Web Congress, pp. 217-223. IEEE, 2009. (Year: 2009).*

(Continued)

*Primary Examiner* — Frank D Mills
(74) *Attorney, Agent, or Firm* — James L. Olsen (57) ABSTRACT

A user requests explanation of a term. In response, a definition is provided. The user can indicate that the user does not understand a new term included in the definition. In response, explanation information is customized based on analysis of the initial term and the new term, and then the explanation information is provided to the user.

17 Claims, 5 Drawing Sheets

(56) References Cited

U.S. PATENT DOCUMENTS

2021/0034816 A1* 2/2021 Lall .................... G06N 5/01
2022/0138422 A1* 5/2022 Kulkarni ............... G06F 40/237
704/9

OTHER PUBLICATIONS

Johns, Brendan T. "Mining a crowdsourced dictionary to understand consistency and preference in word meanings." Frontiers in Psychology 10 (2019): 268. (Year: 2019).*

"Moon+ Reader Pro (Patched)," moddroid.com, Updated May 23, 2020, 6 pages https://moddroid.com/moon-reader-pro.html.

IBM, "Enhanced Reading Comprehension by Automatic Web Searches While Reading," IP.Com, An IP.com Prior Art Database Technical Disclosure, Original Publication Date: Jul. 1, 2000, IP.com No. IPCOM000013329D, IP.com Electronic Publication Date: Jun. 18, 2003, 2 pages, https://priorart.ip.com/IPCOM/000013329.

Cahill et al., "Synonym-Aided Customizable Terminology," IP.Com, An IP.com Prior Art Database Technical Disclosure, Original Publication Date: Feb. 1, 1993, Original Disclosure Information: Research Disclosure n346 02-93, IP.com No. IPCOM000104020D, IP.com Electronic Publication Date: Mar. 18, 2005, 2 pages, https://priorart.ip.com/IPCOM/000104020.

* cited by examiner

100

```
┌─────────────────────────────────────────────┐
│ Receive A First Explanation Request         │
│ Identifying A First Term Included in        │
│ Digital Content                             │
│ 102                                         │
└─────────────────────────────────────────────┘
                      │
                      ▼
┌─────────────────────────────────────────────┐
│ Present a First Definition of the First Term│
│ 104                                         │
└─────────────────────────────────────────────┘
                      │
                      ▼
┌─────────────────────────────────────────────┐
│ Receive Additional Explanation Request(s)   │
│ Regarding Additional Term(s) Included in    │
│ First Definition                            │
│ 106                                         │
└─────────────────────────────────────────────┘
                      │
                      ▼
┌─────────────────────────────────────────────┐
│ Display Explanation Information in place of │
│ the First Definition, wherein the           │
│ Explanation Information is customized based │
│ on the First Definition and the             │
│ Additional Term(s)                          │
│ 108                                         │
└─────────────────────────────────────────────┘
```

PROVIDING CUSTOMIZED TERM EXPLANATION

BACKGROUND

The present invention relates to digital content management and, more specifically, to providing customized term explanation for terms in digital content.

When people are using a computing device to read or browse digital content, such as e-books and web pages, they may encounter difficult terms or concepts in the digital content. The terms are difficult because they have special meanings usually only familiar to people in a specific field or domain. Many people may attempt to utilize a search engine to search for explanation to the term, which can often provide a definition. The search engine may provide a definition of the term. However, it is often the case that other new difficult terms may show up in the definition itself. In order to understand the original term, people have to conduct search for explanation to the new terms and the search may have to be repeated for a few times. Such an experience is unsatisfying to people.

SUMMARY

Some embodiments of the present disclosure can be illustrated as a method. The method comprises identifying a term in digital content in response to a user action requesting explanation of the term. The method further comprises displaying a definition of the term. The method further comprises identifying a new term in the first definition in response to a second user action requestion explanation of the new term. The method further comprises displaying explanation information customized based on the definition and the new term.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 1:
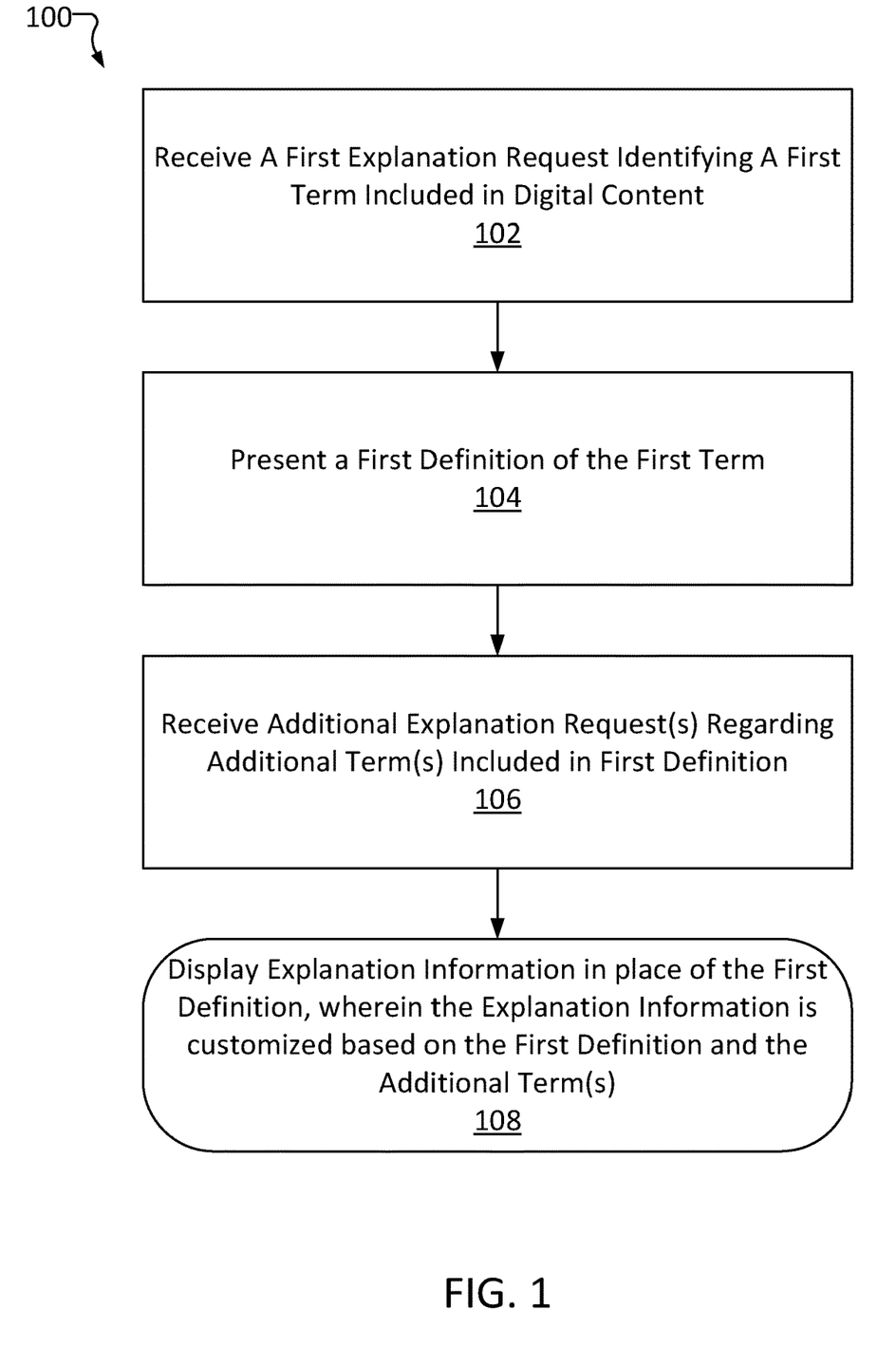
FIG. 1 is a high-level method for presenting customized term explanations, consistent with several embodiments of the present disclosure.

FIG. 1 is a high-level method for presenting customized term explanations, consistent with several embodiments of the present disclosure. Method 100 comprises receiving a first explanation request regarding a first term included in digital content at operation 102. As an example, a user may be reading or browsing digital content, such as an e-book or webpage, displayed on a screen of a computing device such as a notebook computer or smartphone. The user may encounter a term (i.e., a word) the user is unfamiliar with, and may respond by inputting a request for explanation, such as by clicking or tapping a button, performing a gesture, etc. This input may be received via elements of a user interface (UI) at operation 102. FIG. 2A, discussed below, provides an example of digital content, a UI element, and a selected term.

Operation 102 may include identifying, by one or more processing units, a term in a digital content in response to a first user action on the term displayed on a screen of a computing device, the first action requesting explanation to the term (referred to as an "explanation request"). A "term," as used herein, may be one or more words, phrases or other recognizable objects. The one or more words, phrases or other recognizable objects may represent different concepts. For example, "cloud computing," "grid computing," and "distributed computing" may be identified as three terms at the same time in response to the first user action on them.

The first user action may be a predefined action. For example, the user may highlight the term in question, followed by clicking a specified button. According to predefined rules, the first user action may indicate, for example, that the user needs definition, explanation, and/or annotation of the term. As an illustrative example, the term "blockchain" is used repeatedly throughout this disclosure as a placeholder representative of a generic term.

Method 100 further comprises presenting, by one or more processing units, a first definition of the first term at operation 104. As an example, a first definition may read: "A blockchain is a tamper-evident, shared digital ledger that records transactions in a public or private peer-to-peer network." Such an example is illustrated in FIG. 3B as first definition 312, and is described in further detail below. The first definition may be selected for presentation to the user from a definition pool based on a scoring system, as described in further detail below with reference to FIG. 4.

Notably, the presented first definition may itself include terms that are difficult for the user to understand. Thus, method 100 further comprises receiving one or more additional explanation requests regarding one or more additional terms included in the first definition at operation 106. Operation 106 includes identifying, by one or more processing units, at least one additional term in the first definition in response to a second user action on the at least one new term in the first definition, the second user action requesting explanation to the at least one new term.

Operation 106 may include receiving a second user action (which may be a pre-defined action) in a substantially similar manner as that described above with reference to operation 102. Continuing with the "blockchain" example, a second user action may include highlighting two new terms "ledger" and "transaction" in the presented first definition followed by clicking or otherwise selecting a predefined button provided in an interface where the first definition is displayed.

Method 100 further comprises displaying, by one or more processing units, explanation information at operation 108, wherein the explanation information is customized based on the first definition and the at least one new term. The content of the "explanation information" may vary based on circumstance and embodiment, as described in further detail below. In general, explanation information may be a second definition of the first term, a high-level overview of a topic including the first term, first term, a video related to the first term, or the like.

In some embodiments, the explanation information may be a second, "alternative" definition of the term, wherein the alternative definition does not include any of the one or more additional terms identified via operation 106. Continuing with the "blockchain" example, operation 108 may include presenting a second definition reading "Blockchain is the infrastructure that provides a collaborative framework for sharing reliable data." It is to be noted that the alternative definition contains neither "ledger" nor "transaction." This example alternative definition is included in FIG. 3C (as second definition 324), as discussed in further detail below. In other words, although the second user action may signify that the two additional terms "ledger" and "transaction" are difficult to understand or that the user may not be familiar with these terms, in this example the explanation information responsive to the second user action does not explain the two terms themselves. Rather, the alternative definition is displayed to take the place of the first definition of "blockchain." The alternative definition may thus advantageously enable one with a relatively thorough understanding of concepts surrounding the first term (with the exception of the additional term(s) as well as the first term) related to the term in question.

In some embodiments, explanation information may be a third definition of the term and may also include multimedia content about the term. An example of such an embodiment is illustrated at 332 in FIG. 3D, described in further detail below. For example, the explanation information may include a third definition of the term "blockchain" as well as video content describing "blockchain."

Figure 2:
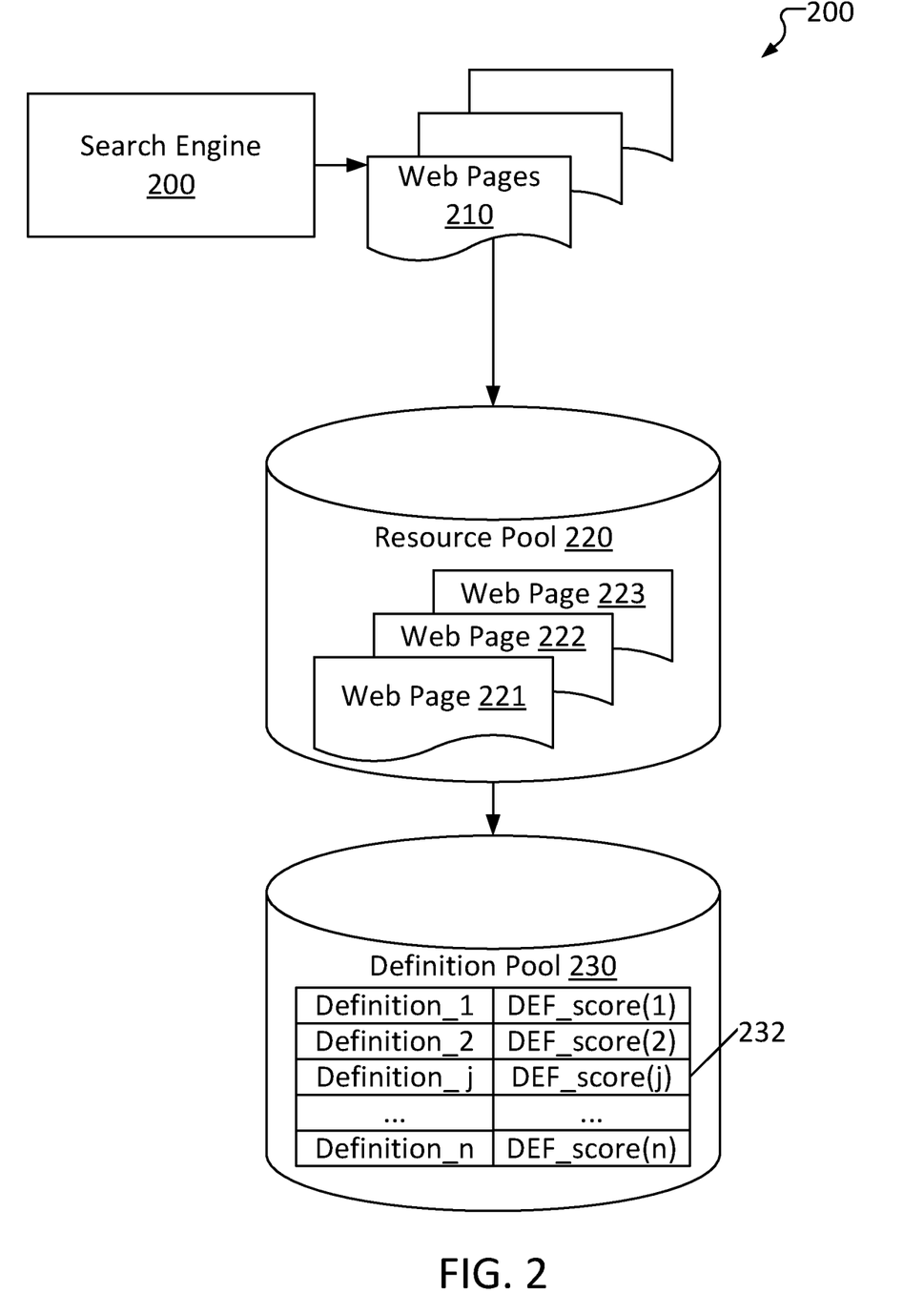
FIG. 2 depicts an example system for definition selection, consistent with several embodiments of the present disclosure.

FIG. 2 depicts an example system 200 for definition selection, consistent with several embodiments of the present disclosure. A search engine 200 may be leveraged to search various online sources, such as web pages and electronic dictionaries (collectively "web pages" 210), for definitions of the first term. For example, search engine 200 may be queried with the term "blockchain" as an input in the format of <blockchain, GLOSSARY>. The item "GLOSSARY" in the format may cause search engine 200 to return webpages containing definitions of the term "blockchain" rather than other information on the term "blockchain," such as advertisements, product promotions, etc. Thus, search engine 200 may return a set of quality web pages 210 containing different definitions of "blockchain," from which one definition may be selected as the first definition according to certain criteria.

In some embodiments, the search strategy may be refined so that the search result is more related to the context or topic in which the term appears. For example, upon identifying the term "blockchain" (such as via operation 102 of method 100) in digital content, the digital content may be analyzed by using any known context recognition techniques to identify a context keyword representing the context in which the term appears. Then, search engine 200 may conduct a context-sensitive search based on the term and the context keyword to retrieve a set of candidate definitions. For example, assume the context keyword is identified to be "cloud computing," which means that the term "blockchain" appears in the context of "cloud computing." Then, search engine 200 may conduct a context-sensitive search with an input in the format of <term>+GLOSSARY+<context_keyword>. Specifically, search engine 200 may conduct a context-sensitive search with an input string of "blockchain GLOSSARY cloud computing." The search engine may return a set of web pages 210 containing definitions of "blockchain" that are more relevant to the context of "cloud computing," from which the first definition may be selected.

In order to select a first definition from web pages 210, a resource pool 220 may be generated from the set of web pages 210. For example, resource pool 220 may include a top number n (e.g., 1<n<20) of the set of web pages 210. These top n web pages are depicted in FIG. 2 as a second set of webpages including web page 221, web page 222, and web page 223 (collectively "web pages 221-223"). Due to the query submitted to search engine, each of the n web pages 221-223 may include a definition of the term "blockchain." Thus, resource pool 220 may comprise n definitions of the term "blockchain." Web pages 221-223 may additionally contain multimedia contents such as images and/or videos relating to the term "blockchain." Web pages 221-223 may further comprise page data such as page ranking, authority score, cite times for individual web pages, and the like.

In addition, or optionally, a definition pool 230 may be generated from resource pool 220. Definition pool 230 comprises different definitions extracted from the web pages in resource pool 220 (i.e., from web pages 221-223). The definitions constitute a set of candidate definitions from which the first definition may be selected for presentation to a user (for example, via operation 104 of method 100).

In some embodiments, the candidate definitions may be weighted by calculating scores for each candidate definition according to one or more of the following parameters: word frequency, information richness, authority score, cite times and page rank. The candidate definition with the highest score may be selected as the first definition to be displayed.

For example, the definition score for a certain candidate definition, definition_i, may be calculated according to Equation (1):

$$DEF\_score(i)=a*(def\_word\_freq(i))+ \\ (b*info\_richness)+c*(authority\_score)+d*(cite\_times)+e*(page\_ranking) \quad (1)$$

In Equation (1), a, b, c, d, and e are weight coefficients, def word_freq(i) is the sum of word frequency values for each entity word, excluding the term in question, comprised in definition_i; parameter info_richness is the value of information richness for the web page containing definition_i; cite_times is the citation times of the web page; and page_ranking is the ranking value of the web page. These parameters and coefficients are discussed in further detail below.

As is known in the field of natural language processing, "word frequency" is a measurement of relative frequency of occurrence of a word in a text. As used herein, word frequency, denoted as word_freq(w), is a measurement of relative frequency of occurrence of a word, w, in a definition pool such as pool 230. Specifically, the value of word_freq (w) is the number of times the word w occurs in definition pool 230 divided by the largest number of times a word occurs in the definition pool 230. For example, the word "ledger" may appear three times in the various definitions of definition pool 230. A certain word "transaction" may be the most frequently used word in definition pool 230, occurring ten times in the definitions of the definition pool. Then, the word frequency of "ledger," word_freq (ledger) is 0.3 (i.e., 3/10).

The parameter def word_freq(i) is the sum of word frequency values for each entity word, excluding the term in question, comprised in definition_i. To calculate def word_freq(i) for a certain definition_i, a word frequency list may be created for definition_i, which comprises values of word frequency, word_freq( ) for corresponding entity words in definition_i, except for the term in question which is the target of definition_i and usually appears at the beginning of definition_i. For example, definition_i is a definition for "blockchain," then it is not necessary to calculate word frequency for "blockchain." In this way, n word frequency lists may be created for the respective n definitions in definition pool 230. Thus, parameters def word_freq(1) . . . def word_freq(n) in Equation (1) may be calculated for all definition_1, . . . ,definition_n in definition pool 230.

As stated above, word frequency is a measurement of relative frequency of occurrence of a word. Accordingly, the higher the word frequency value of a word is, the more times the word appears in the definitions of the domain, indicating that it is a domain-wide high-frequency word and thus is a "core" word. The parameter def word_freq(i) in Equation (1) is the sum of the word frequency values of all the entity words in definition_i, which may represent a score of high-frequency words, namely core vocabulary, in the domain.

The parameter "info_richness" is a measurement for richness of digital media elements, such as images and videos, of a web page. For example, "rich media" is an Internet advertising term for a web page ad that uses advanced technology such as streaming video, downloaded applets (programs) that interact instantly with the user, and ads that change when the user's mouse cursor passes over it. The value of "info_richness" may be the number of digital media elements on the web page. The number may be obtained by counting the digital media elements, such as the images and videos associated with the content on the web page. In general, digital media elements may be easier for users to understand, so the higher the value of info_richness, the less difficult it would be for users to understand the content.

The parameter "authority_score" denotes a degree of authority of a web page. The value of "authority_score" is available from the search engine. In general, the higher the value, the more reliable the web page as information source.

The parameter "cite_times" denotes the number of times a web page is referenced. The number is available from the search engine. The higher the value, the higher the quality of the web page.

The parameter "page_ranking" denotes a degree of relevance of a web page. The value of "page_ranking" is available from the search engine. For example, a web page with a page_ranking of 1 may be a "top result" of a search engine query.

The values of weight coefficients a, b, c, d, and e in Equation (1) can be customized according to specific fields or requirements. For example, the value of info_richness is a natural number greater than 1. And according to the numerical specification provided by mainstream search engines, the value of authority_score is a decimal, the value of cite_times is a natural number greater than 1 and the values of page_ranking is a natural number greater than 1. Correspondingly, the values of b, c, d and e may be set in the following ranges: $0 \le b \le 1$, $1 \le c \le 9$, $0 \le d \le 1$ and $0 \le e \le 1$. In order to distinguish the values of DEF_score of different definition while taking domain core words contained in the definitions as the most important factor to consider in selecting the first definition, the value of weight coefficient a may be set to be greater than c (i.e., a>c).

In some embodiments, in calculating definition scores, only the total word frequency value of entity words for each of the set of candidate definitions may be considered. This may be expressed in Equation (2):

$$DEF\_score(i)=def\_word\_freq(i) \quad (2)$$

As shown in FIG. 2, definition scores are calculated for all definitions in definition pool 230. The result is illustrated in table 232, where each definition is now having a corresponding definition score. For example, the definition score for definition_1 is DEF_score(1).

Thus, referring briefly back to FIG. 1, operation 104 may include selecting a first definition with a highest definition score from a set of candidate definitions included in a table such as table 232. Assuming, for example, DEF_score(j) in table 232 is the highest, therefore, definition_j will be selected as the first definition at operation 104.

This is because, due to how DEF_score(j) is calculated via Equation (1) or Equation (2), candidate definition definition_j may contain relatively important keywords in the domain and may be originated from a source of relatively high quality. Thus, definition_j is likely to be the most appropriate definition of the term.

The above description provides embodiments of the selection of the first definition to be presented at operation 104. Now, with continued reference to FIG. 2 and the parameters of Equation (1), further description will be provided regarding the preparation of explanation information to be displayed (such as via operation 108 of method 100).

In some embodiments, a level of understanding of domain knowledge may be evaluated based on the first definition of the term (for example, the first definition provided at operation 104) and the at least one additional term (for example, the additional term(s) identified at operation 106).

First, the word frequency of a target definition that could match the user's understanding level is calculated based on the first definition and the at least one new term. As an illustrative example, the additional term(s) may include x terms: T(1), T(2), . . . T(x). The word frequency of the target definition, word_freq_target_def, may be calculated according to Equation (3) as follows:

$$\text{word\_freq\_target\_}def = def\_\text{word\_freq}(j) - ((\text{word\_freq}(T(1)) + \ldots + \text{word\_freq}(T(x)))) \quad (3)$$

In Equation (3), the item def word_freq(j) is the sum of the word frequency values of all the words in the first definition definition_j, and the item word_freq(T(1)) is the word frequency of T(1), word_freq(T(x)) is the word frequency of T(x), and so on. As described above with respect to Equation (1), word frequency, word_freq(w), is a measurement of relative frequency of occurrence of a word, w, in a definition pool (such as definition pool 230).

In the instant example, Equation (3) may be embodied as: word_freq_target_def=def word_freq(j)−((word_freq(ledger)+word_freq(transaction)).

The word frequency of the target definition, word_freq_target_def, is a measure of the user's level of understanding general concepts in the field. Specifically, if word_freq_target_def is relatively high, it means that the user is likely able to understand general concepts of the field, though the user is somewhat confused by the specific terms "ledger" and "transaction." If word_freq_target_def is relatively low, it means the user may have difficulty in understanding general concepts in the field, meaning even if an alternative definition is provided, it might also be difficult for the user to understand.

In some instances, if word_freq_target_def exceeds a pre-defined threshold of level of understanding, Level threshold, an alternative definition may be selected from a definition pool (such as, for example, definition pool 230), wherein the alternative definition should meet the requirement that it does not contain any of the one or more additional term(s), T(1), . . . T(x).

In some embodiments, if there are more than one candidate definition in definition pool 230 that does not contain any of the one or more additional term(s), then the candidate with def word_freq nearest to word_freq_target_def will be the alternative definition.

Figure 3A:
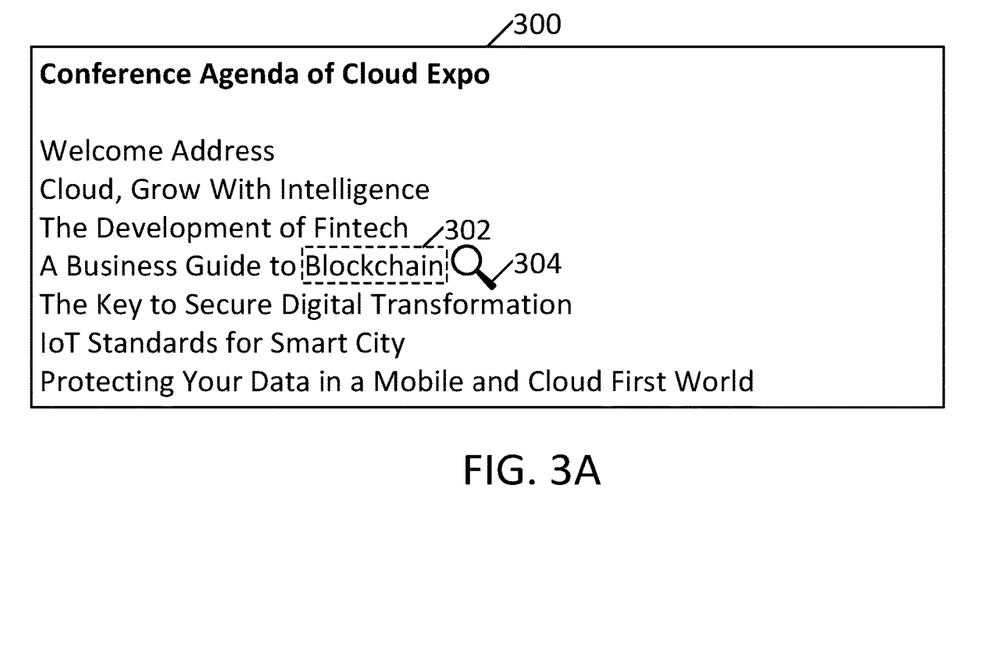
FIG. 3A depicts an illustrative example of content including an option enabling a user to request an explanation, consistent with several embodiments of the present disclosure.
Figure 3B:
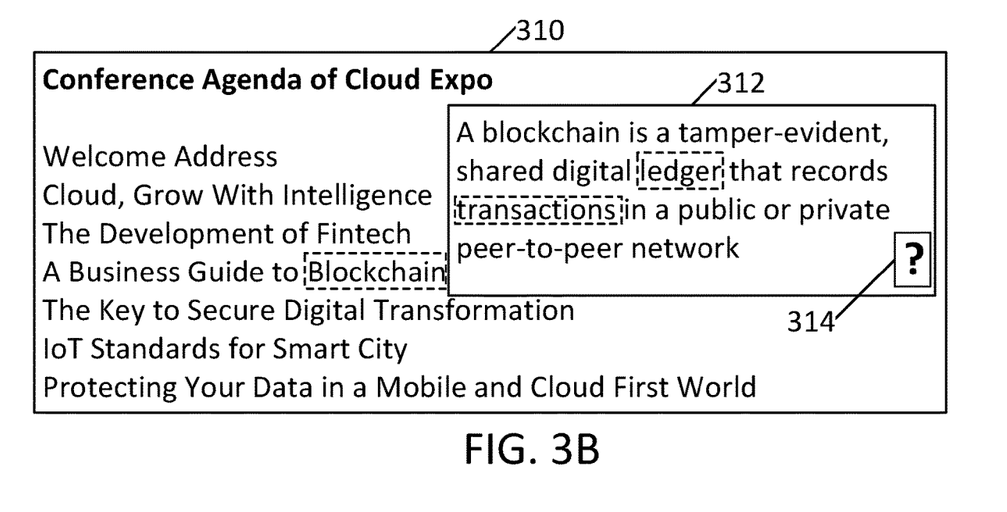
FIG. 3B depicts an example of content including a first definition, consistent with several embodiments of the present disclosure.

FIGS. 3A-3D depict illustrative examples of presented content and customized term explanations, consistent with several embodiments of the present disclosure. For example, FIG. 3A depicts an illustrative example of digital content 300 including a user interface (UI) element 304 enabling a user to request an explanation of a term 302. In the example shown in FIG. 3A, UI element 304, resembling a magnifying glass, may be presented to a user upon the user highlighting term 302, the word "blockchain." Thus, the user may indicate, via highlighting term 302 and clicking UI element 304, that the user desires an explanation of the term "blockchain." This may cause a system to receive the request (such as, for example, via operation 102 of method 100).

FIG. 3B depicts an example of digital content 310 including a first definition 312, consistent with several embodiments of the present disclosure. As can be seen in FIG. 3B, first definition 312 reads "A blockchain is a tamper-evident, shared digital ledger that records transactions in a public or private peer-to-peer network." As system may select first definition 312 from a database such as, for example, definition pool 230 as described with reference to FIG. 2, above.

First definition 312 may be presented to the user (via, for example, operation 104 of method 100) in response to the user requesting explanation of the first term (such as via UI element 304). However, when presented with first definition 312, a user may indicate that additional terms included within first definition 312 are difficult to understand. The user may indicate a lack of understands of the additional terms by highlighting the additional terms and selecting a second UI element 314 (represented in the example depicted in FIG. 3B as a button with a question mark emblem). In the example depicted in FIG. 3B, the user has selected additional terms "ledger" and "transactions." This may cause a system to receive the request for explanation of the additional terms (via, for example, operation 106 of method 100).

Figure 3C:
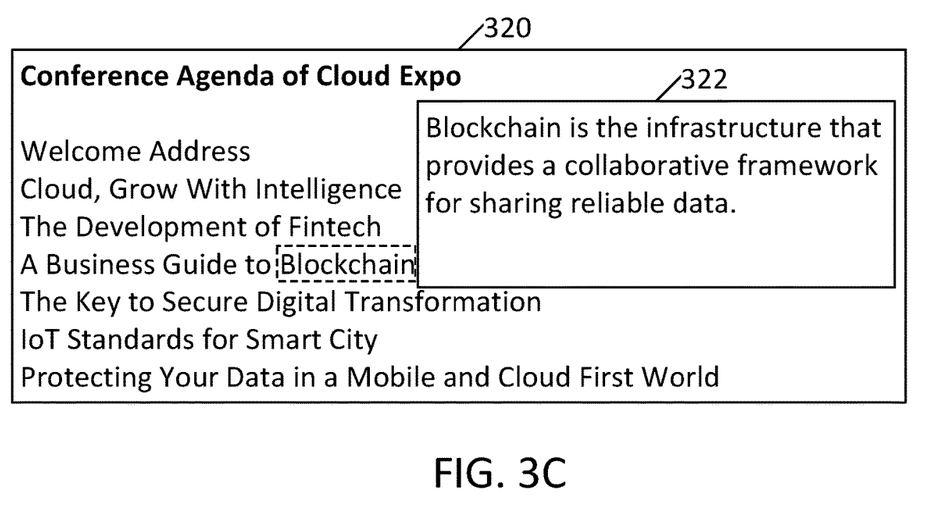
FIG. 3C depicts an example of content including a presented alternative definition, consistent with several embodiments of the present disclosure.

FIG. 3C depicts an example of digital content 320 including a presented second, alternative definition 322, consistent with several embodiments of the present disclosure. As can be seen in FIG. 3C, second definition 322 reads "Blockchain is the infrastructure that provides a collaborative framework for sharing reliable data." A system may present second definition 322 may be presented to the user (via, for example, operation 108 of method 100) in response to the user requesting explanation of the additional terms (such as via UI element 314).

Notably, second definition 322 omits reference to the additional terms selected by the user ("ledger" and "transactions"). A system may present second definition 322 in response to a determination that word_freq_target_def, calculated via Equation (3), is above a predefined threshold. This may indicate that a user has a relatively high level of knowledge in the field, meaning that a more basic overview may be unnecessary; instead, simply presenting a different definition (324) without the additional terms will suffice.

Figure 3D:
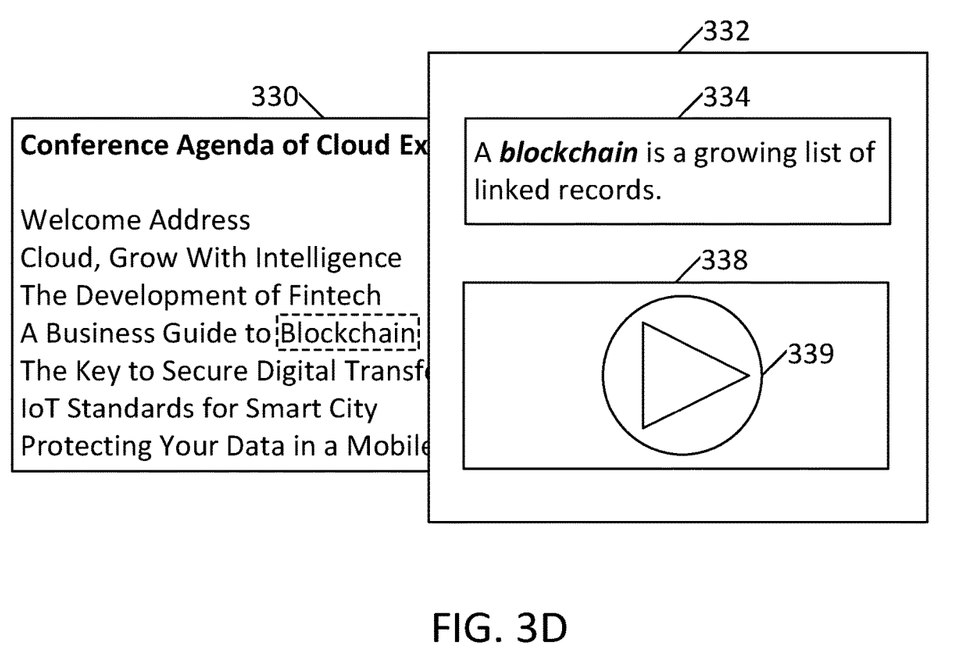
FIG. 3D depicts an example of content including presented contextual and multimedia explanatory content, consistent with several embodiments of the present disclosure.

FIG. 3D depicts an example of digital content 330 including presented contextual and multimedia explanatory information 332, consistent with several embodiments of the present disclosure. Explanatory information 332 may be provided if word_freq_target_def does not exceed Level threshold. Explanatory information 332 may include, for example a third definition 334 and multimedia 338 (which may be a video, playable via button 339). Third definition 334 may contain a basic introduction message of the term. Using the term "blockchain" in the instant example, third definition 334 may read: "A blockchain is a growing list of linked records." Multimedia component 338 may include, for example, one or more images and/or videos relating to the term. Explanatory information 332 may be composed from information and multimedia and/or rich media components contained in web pages, such as web pages 221-223, described above with reference to FIG. 2. Explanatory information 332 may be rendered in place of the first definition 312.

In some embodiments, explanatory information 332 may be extracted from a single web page (such as, for example, web page 222). Alternatively, explanatory information may be extracted from different web pages. For example, a relatively frequently played video may be extracted from a first web page in a resource pool (such as, for example, web page 222 of resource pool 220). A definition of the term (e.g., blockchain) may be extracted from a web page with a relatively high value of info_richness as the basic introduction message of the term, to be presented as third definition 334. The video and the definition of the term may be combined to customize explanatory information 332. As mentioned earlier with respect to Equation (1), the parameter info_richness counts the number of multimedia/rich media on a web page (such as image, video, etc.). In general, the higher the number, the less difficult the definition in the same web page may be to understand. Therefore, the customized explanation information may provide easy-to-understand information customized for one with a relatively low knowledge base in a relevant technical field (as evidenced by the word_freq_target_def score being below the predefined threshold) to better understand the term.

As an example, a user may request explanation of the term "blockchain." A system may select a first definition from a definition pool in response to the request. The first definition may be selected based on a score calculated via Equation (1). The selected first definition may then be presented to the user. The user may then indicate that the user does not understand the term "ledger," included in the first definition. The system may then determine a value of word_freq_target_def (via Equation (3)) to be, as an example, 1.2. The value of 1.2 is compared to a predefined threshold such as, for example, 1.0. As word_freq_target_def is above the threshold, the user may have a relatively high knowledge in a technical field including blockchain, so the system may select a second definition from the definition pool by first discounting all definitions in the definition pool that include the term "ledger," and selecting the remaining definition having the highest score. The second definition may then be presented to the user. Thus, the user may be provided with a definition that the user can understand, while still leveraging the user's relative competence in the relevant field.

Alternatively, upon being presented with the first definition, the user may indicate that the user does not understand the terms "ledger" or "transaction," both included in the first definition. Accounting for both terms, the system may determine (via equation (3)) that the word_freq_target_def is 0.7, below the predefined threshold of 1.0. In response to this determination, the system may instead select and present a third "overview" definition and multimedia content to the user. Thus, the user may be provided with a customized introductory-level description of "blockchain" alongside accompanying video, which will provide the user a "crash course" tailored to the user's level of understanding. The third definition may also omit mention of "ledger" and "transaction."

Embodiments of the invention have been described with reference to detailed examples and specific algorithms which are illustrative rather than limiting. From the description of the embodiments, advantages of the invention also become evident. With the method for providing customized explanation to terms of the invention, alternative definition of a term may be provided without particularly difficult words for users with a relatively high domain knowledge base, and/or multimedia/rich media enhanced information may be provided which might be easy to understand for users with a relatively low domain knowledge base.

Figure 4:
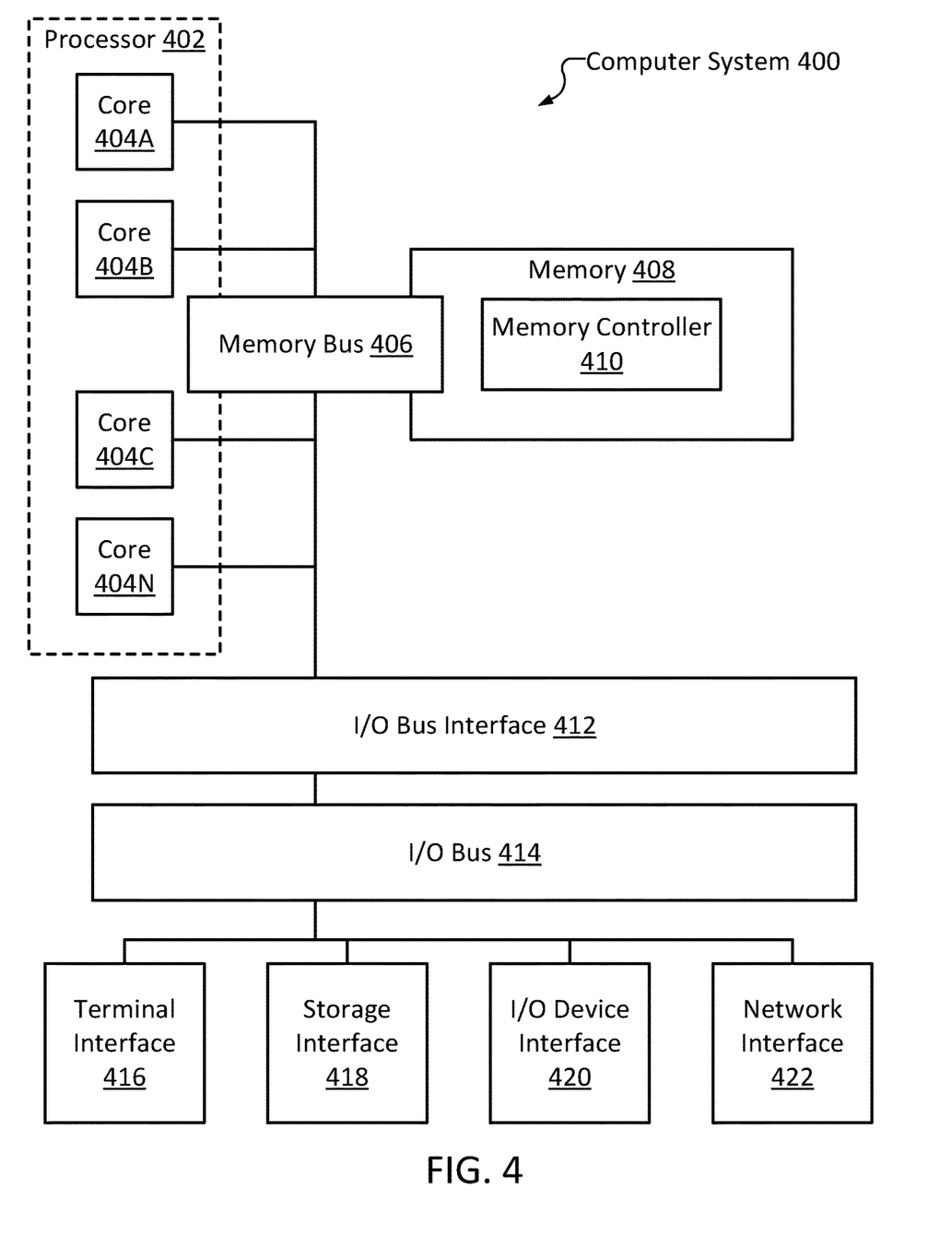
FIG. 4 illustrates a high-level block diagram of an example computer system that may be used in implementing embodiments of the present disclosure.

Referring now to FIG. 4, shown is a high-level block diagram of an example computer system 400 that may be configured to perform various aspects of the present disclosure, including, for example, method 100. The example computer system 400 may be used in implementing one or more of the methods or modules, and any related functions or operations, described herein (e.g., using one or more processor circuits or computer processors of the computer), in accordance with embodiments of the present disclosure. In some embodiments, the major components of the computer system 400 may comprise one or more CPUs 402, a memory subsystem 408, a terminal interface 416, a storage interface 418, an I/O (Input/Output) device interface 420, and a network interface 422, all of which may be communicatively coupled, directly or indirectly, for inter-component communication via a memory bus 406, an I/O bus 414, and an I/O bus interface unit 412.

The computer system 400 may contain one or more general-purpose programmable central processing units (CPUs) 402, some or all of which may include one or more cores 404A, 404B, 404C, and 404D, herein generically referred to as the CPU 402. In some embodiments, the computer system 400 may contain multiple processors typical of a relatively large system; however, in other embodiments the computer system 400 may alternatively be a single CPU system. Each CPU 402 may execute instructions stored in the memory subsystem 408 on a CPU core 404 and may comprise one or more levels of on-board cache.

In some embodiments, the memory subsystem 408 may comprise a random-access semiconductor memory, storage device, or storage medium (either volatile or non-volatile) for storing data and programs. In some embodiments, the memory subsystem 408 may represent the entire virtual memory of the computer system 400 and may also include the virtual memory of other computer systems coupled to the computer system 400 or connected via a network. The memory subsystem 408 may be conceptually a single monolithic entity, but, in some embodiments, the memory subsystem 408 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 408 may contain elements for control and flow of memory used by the CPU 402. This may include a memory controller 410.

Although the memory bus 406 is shown in FIG. 4 as a single bus structure providing a direct communication path among the CPU 402, the memory subsystem 408, and the I/O bus interface 412, the memory bus 406 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 412 and the I/O bus 414 are shown as single respective units, the computer system 400 may, in some embodiments, contain multiple I/O bus interface units 412, multiple I/O buses 414, or both. Further, while multiple I/O interface units are shown, which separate the I/O bus 414 from various communications paths running to the various I/O devices, in other embodiments some or all of the I/O devices may be connected directly to one or more system I/O buses.

In some embodiments, the computer system 400 may be a multi-user mainframe computer system, a single-user system, or a server computer or similar device that has little or no direct user interface but receives requests from other computer systems (clients). Further, in some embodiments, the computer system 400 may be implemented as a desktop computer, portable computer, laptop or notebook computer, tablet computer, pocket computer, telephone, smart phone, mobile device, or any other appropriate type of electronic device.

It is noted that FIG. 4 is intended to depict the representative major components of an exemplary computer system 400. In some embodiments, however, individual components may have greater or lesser complexity than as represented in FIG. 4, components other than or in addition to those shown in FIG. 4 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    identifying, by one or more processing units, a first term in a digital content in response to a first user action by a user on the first term, the first action requesting explanation of the first term;
    displaying, by the one or more processing units, a first definition of the first term within a user interface (UI), the first definition selected from a set of candidate definitions;
    identifying, by the one or more processing units, a first new term in the first definition that the user does not understand in response to the user selecting the first new term within the UI and executing a UI element within the UI indicating that the user does not understand the first new term;
    calculating, by the one or more processing units, a level of user understanding on the set of candidate definitions by subtracting a word frequency value of the first new term within the set of candidate definitions from a word frequency sum value of entity words within the first definition excluding the first term with respect to the set of candidate definitions;
    determining, by the one or more processing units, that the level of user understanding exceeds a predefined threshold;
    selecting, by the one or more processing units and based on the determining, an alternative definition of the first term that does not include the first new term from the set of candidate definitions; and
    displaying, by the one or more processing units, explanation information within the UI, wherein the explanation information includes the alternative definition.

2. The computer-implemented method of claim 1, wherein the explanation information further comprises:
    multimedia enhanced information relating to the first term; and
    rich media enhanced information relating to the first term.

3. The computer-implemented method of claim 1, wherein the first definition is selected from the set of candidate definitions by:
    performing, by the one or more processing units, an online search to retrieve a plurality of web pages containing definitions of the first term;
    extracting, by the one or more processing units, the set of candidate definitions from selected web pages of the plurality of web pages;
    calculating, by the one or more processing units, ranking scores of the set of candidate definitions according to one or more parameters, wherein the parameters include a total word frequency value of entity words for each of the set of candidate definitions; and
    selecting, by the one or more processing units, a definition with a highest score from the set of candidate definitions as the first definition.

4. The computer-implemented method of claim 3, further comprising analyzing, by the one or more processing units, a context of the first term to identify a context keyword representing the context of the first term, wherein the performing an online search to retrieve a plurality of web pages containing definitions of the first term is based on the first term and the context keyword.

5. The computer-implemented method of claim 1, further comprising:
    identifying, by the one or more processing units, a second new term in the first definition that the user does not understand in response to the user selecting the second new term within the UI and executing a second UI element within the UI indicating that the user does not understand the second new term; and
    displaying, by the one or more processing units, explanation information within the UI, wherein the explanation information includes a second alternative definition of the first term that does not include the identified first new term or the identified second new term.

6. The computer-implemented method of claim 1, wherein in response to determining, by the one or more processing units, that the level of understanding does not exceed the predefined threshold, the method further comprises:
    composing rich media enhanced information relating to the first term, wherein the rich media enhanced information comprises a rich media component and an introduction message of the first new term extracted from a web page.

7. A system, comprising:
    a memory; and
    a central processing unit (CPU) coupled to the memory, the CPU configured to:
        identify a first term in a digital content in response to a first user action by a user on the first term, the first action requesting explanation of the first term;
        display a first definition of the first term within a user interface (UI), the first definition selected from a set of candidate definitions;
        identify a first new term in the first definition that the user does not understand in response to the user selecting the first term within the UI and executing a UI element within the UI indicating that the user does not understand the first new term;
        calculate a level of user understanding on the set of candidate definitions by subtracting a word frequency value of the first new term within the set of candidate definitions from a word frequency sum value of entity words within the first definition excluding the first term with respect to the set of candidate definitions;
        determine that the level of user understanding exceeds a predefined threshold;
        select an alternative definition of the first term from the set of candidate definitions; and
        display explanation information within the UI, wherein the explanation information includes the alternative definition.

8. The system of claim 7, wherein the explanation information further comprises:
    multimedia enhanced information relating to the first term; and
    rich media enhanced information relating to the first term.

9. The system of claim 7, wherein to select the first definition from the set of candidate definitions, the CPU is further configured to:
- perform an online search to retrieve a plurality of web pages containing definitions of the first term;
- extract the set of candidate definitions from selected web pages of the plurality of web pages;
- calculate ranking scores of the set of candidate definitions according to one or more parameters, wherein the parameters include a total word frequency value of entity words for each of the set of candidate definitions; and
- select a definition with a highest score from the set of candidate definitions as the first definition.

10. The system of claim 9, wherein the CPU is further configured to analyze a context of the first term to identify a context keyword representing the context of the first term, wherein the performing an online search to retrieve a plurality of web pages containing definitions of the first term is based on the first term and the context keyword.

11. The system of claim 7, wherein the CPU is further configured to:
- identify a second new term in the first definition that the user does not understand in response to the user selecting the second new term within the UI and executing a second UI element within the UI indicating that the user does not understand the second new term; and
- display explanation information within the UI, wherein the explanation information includes a second alternative definition of the first term that does not include the identified first new term or the identified second new term.

12. The system of claim 8, wherein in response to determining that the level of understanding does not exceed the predefined threshold, the CPU is further configured to:
- compose rich media enhanced information relating to the first term, wherein the rich media enhanced information comprises a rich media component and an introduction message of the first new term extracted from a web page.

13. A computer program product, the computer program product comprising a computer readable storage medium having program instructions embodied therewith, the program instructions executable by a computer to cause the computer to:
- identify a first term in a digital content in response to a first user action by a user on the first term, the first action requesting explanation of the first term;
- display a first definition of the first term within a user interface (UI), the first definition selected from a set of candidate definitions;
- identify a first new term in the first definition that the user does not understand in response to the user selecting the first term within the UI and executing a UI element within the UI indicating that the user does not understand the first new term;
- calculate a level of user understanding on the set of candidate definitions by subtracting a word frequency value of the first new term within the set of candidate definitions from a word frequency sum value of entity words within the first definition excluding the first term with respect to the set of candidate definitions;
- determine that the level of user understanding exceeds a predefined threshold;
- select an alternative definition of the first term from the set of candidate definitions; and
- display explanation information within the UI, wherein the explanation information includes the alternative definition.

14. The computer program product of claim 13, wherein the explanation information further comprises:
- multimedia enhanced information relating to the first term; and
- rich media enhanced information relating to the first term.

15. The computer program product of claim 13, wherein to select the first definition from the set of candidate definitions, the instructions further cause the computer to:
- perform an online search to retrieve a plurality of web pages containing definitions of the first term;
- extract the set of candidate definitions from selected web pages of the plurality of web pages;
- calculate ranking scores of the set of candidate definitions according to one or more parameters, wherein the parameters include a total word frequency value of entity words for each of the set of candidate definitions; and
- select a definition with a highest score from the set of candidate definitions as the first definition.

16. The computer program product of claim 13, wherein the instructions further cause the computer to:
- identify a second new term in the first definition that the user does not understand in response to the user selecting the second new term within the UI and executing a second UI element within the UI indicating that the user does not understand the second new term; and
- display explanation information within the UI, wherein the explanation information includes a second alternative definition of the first term that does not include the identified first new term or the identified second new term.

17. The computer program product of claim 13, wherein in response to determining that the level of understanding does not exceed the predefined threshold, the instructions further cause the computer to:
- compose rich media enhanced information relating to the first term, wherein the rich media enhanced information comprises a rich media component and an introduction message of the first new term extracted from a web page.

* * * * *